United States Patent [19]

Brown et al.

[11] Patent Number: 4,845,663
[45] Date of Patent: Jul. 4, 1989

[54] IMAGE PROCESSOR WITH FREE FLOW PIPELINE BUS

[75] Inventors: Dwight E. Brown, Pasadena; Mark S. Laughery, Northridge; Thomas A. Lang, Tempe City, all of Calif.

[73] Assignee: Minnesota Mining and Manufacturing Company, St. Paul, Minn.

[21] Appl. No.: 92,719

[22] Filed: Sep. 3, 1987

[51] Int. Cl.⁴ .................... G06F 15/20; G06K 9/36
[52] U.S. Cl. ............................. 364/900; 382/41
[58] Field of Search ............... 364/200, 900, 521; 358/280; 382/41; 340/799

[56] References Cited

U.S. PATENT DOCUMENTS

| Re. 31,200 | 4/1983 | Sukonick et al. | 340/724 |
|---|---|---|---|
| 3,676,860 | 7/1972 | Collier et al. | 364/200 |
| 3,815,099 | 6/1974 | Cohen et al. | 364/200 |
| 3,866,181 | 2/1975 | Gayman et al. | 364/200 |
| 3,997,896 | 12/1976 | Cassarino, Jr. et al. | 364/200 |
| 4,174,514 | 12/1979 | Sternberg | 364/200 X |
| 4,232,366 | 11/1980 | Levy et al. | 364/200 |
| 4,330,833 | 5/1982 | Pratt et al. | 364/515 |
| 4,484,346 | 11/1984 | Sternberg et al. | 382/27 |
| 4,484,349 | 11/1984 | McCubbrey | 382/49 |
| 4,494,192 | 1/1985 | Lew et al. | 364/200 |
| 4,543,628 | 9/1985 | Pomfret | 364/200 |
| 4,545,068 | 10/1985 | Tabata et al. | 364/900 X |
| 4,550,437 | 10/1985 | Kobayashi et al. | 364/200 X |
| 4,574,394 | 3/1986 | Holsztynski et al. | 364/200 X |
| 4,594,653 | 6/1986 | Iwashita et al. | 364/200 |
| 4,658,354 | 4/1987 | Nukiyama | 364/200 |
| 4,674,034 | 6/1987 | Iwashita et al. | 364/200 |

OTHER PUBLICATIONS

Evans, D. J., "Parallel Processing", *Data Processing*, vol. 28, No. 10, pp. 529-542 (Dec. 1986).

Ngan, K. N., "Parallel Image-Processing System Based on the TMS32010 Digital Signal Processor", *IEE Proceedings*, vol. 134, Pt. E, No. 2, pp. 119-124 (Mar. 1987).

*Primary Examiner*—Raulfe B. Zache
*Attorney, Agent, or Firm*—Donald M. Sell; Walter N. Kirn; William D. Bauer

[57] ABSTRACT

A digital image processing system has a pipeline bus for transferring addresses and data in parallel among the components of the system, which include an image memory, an address generator and an intensity processor. The pipeline bus includes a pipeline address bus, a pipeline data bus, and a master timing bus. Through the use of handshake signals, the pipeline bus permits a free flow of pipelined data among the components at whatever rate is necessary to complete the particular processing task. Image data is transferred in the form of N×N pixel subimage blocks which can be addressed using a single address.

47 Claims, 12 Drawing Sheets

FIG. 2B

- PD00 — ⎫
- PD07 — ⎭ 232
- PD10 — ⎫
- PD17 — ⎭ 234
- PD20 — ⎫
- PD27 — ⎭ 236
- PD30 — ⎫
- PD37 — ⎭ 238
- NPDR — 240
- NPDA — 242
- NPDS — 244
- NWB0 — 246
- NWB1 — 248
- NWB2 — 250
- NWB3 — 252
- RDE — 254

FIG. 2A

- XP0 — ⎫
- XP12 — ⎭ 210
- YP0 — ⎫
- YP12 — ⎭ 212
- NPAR — 214
- NPAD — 216
- NPAS — 218
- R/W — 220
- I/O — 222
- MODE — 224
- P0 — 226
- P1 — 228
- PG — 230

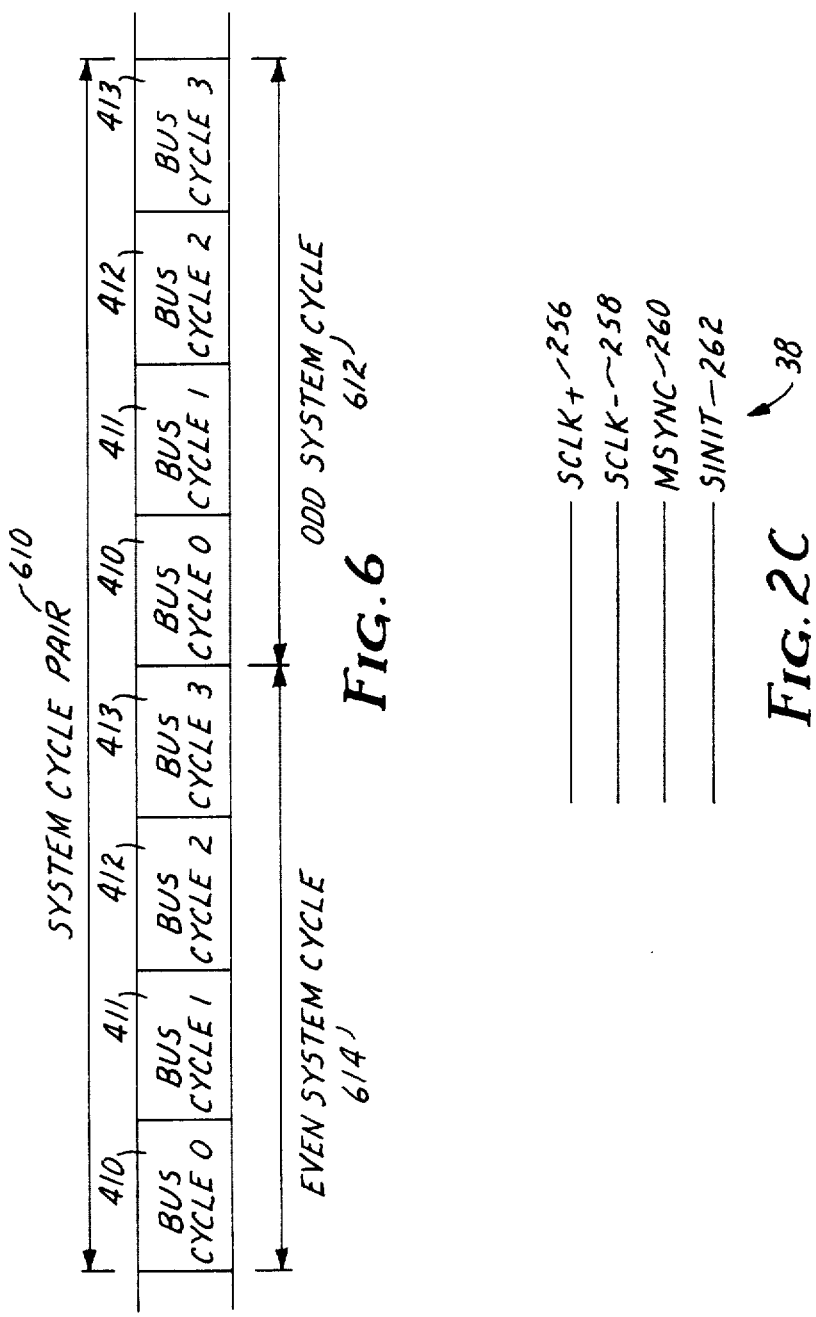

IMAGE PROCESSOR WITH FREE FLOW PIPELINE BUS

BACKGROUND OF THE INVENTION

1. Field of the Invention.

The present invention relates to digital image processing systems. In particular, the present invention relates to a digital image processing system which permits free flow of high speed image data and addresses in a pipelined architecture.

2. Description of the Prior Art.

Over the years many different types of digital image processing systems have been developed and have found use in various fields such as medical imaging, remote sensing, and graphic arts. However, this development primarily has been directed toward evolving new processor elements with more efficient architecture, larger and faster memory elements and more sophisticated input-output elements. There has been little change in the technology involved in transferring information among the various elements in the image processing system.

In digital imaging processing systems, it is typical to use pipeline architecture in which parallel digital data flows from one element to another within the image processor. This pipeline architecture provides the opportunity for high speed data transfers, since the data is transferred in parallel from one element to the next within the pipeline image processor. Each element or block within the processor performs a dedicated function and passes its results along to the next element in the processor.

This prior art pipeline image processor architecture, however, has encountered practical limitations in the computational complexity of image processing functions which could be performed. Typically, the processor is synchronized to the video monitor, which places a practical limit on the maximum time a processing task can consume in any one of the pipeline processor blocks. That in turn places a limit on the computational complexity which can be performed by the image processor. Standard buses such as VME and MULTIBUS are capable of handling image functions of high computational complexity, but are not capable of sustaining the high transfer rates required of a high performance image processing system.

SUMMARY OF THE INVENTION

The present invention is an image processing system in which the various components of the image processing system communicate with one another by transferring addresses and data in parallel over a pipeline bus.

The image processing system includes image memory means for storing digital image data, intensity processor means for performing processing functions on the image data, and address generator means for generating addresses. All of these components communicate with one another over the pipeline bus.

With the present invention, therefore, the pipeline bus uses a handshaking protocol which permits very high speed address and data transfer but has a start/stop free flow format which permits the pipeline bus to run at any throughput rate. This is important in pipelined image processing because the computational complexity varies from operation to operation. With the present invention, the pipeline bus permits free flow through all components connected to the pipeline bus regardless of the operation being performed, without sacrificing indefinitely sustainable high transfer rates.

BRIEF DESCRIPTION OF THE DRAWINGS

FIGS. 2A, 2B and 2C show pipeline address (PA) bus, a pipeline data (PD) bus, and a master timing (MT) bus, respectively, of the pipeline bus of FIG. 1.

FIG. 6 is a diagram illustrating odd and even system cycles in a system cycle pair on the PD bus of FIG. 2B.

DETAILED DESCRIPTION OF THE PREFERRED EMBODIMENTS

1. Digital Image Processor 10

Figure 1:
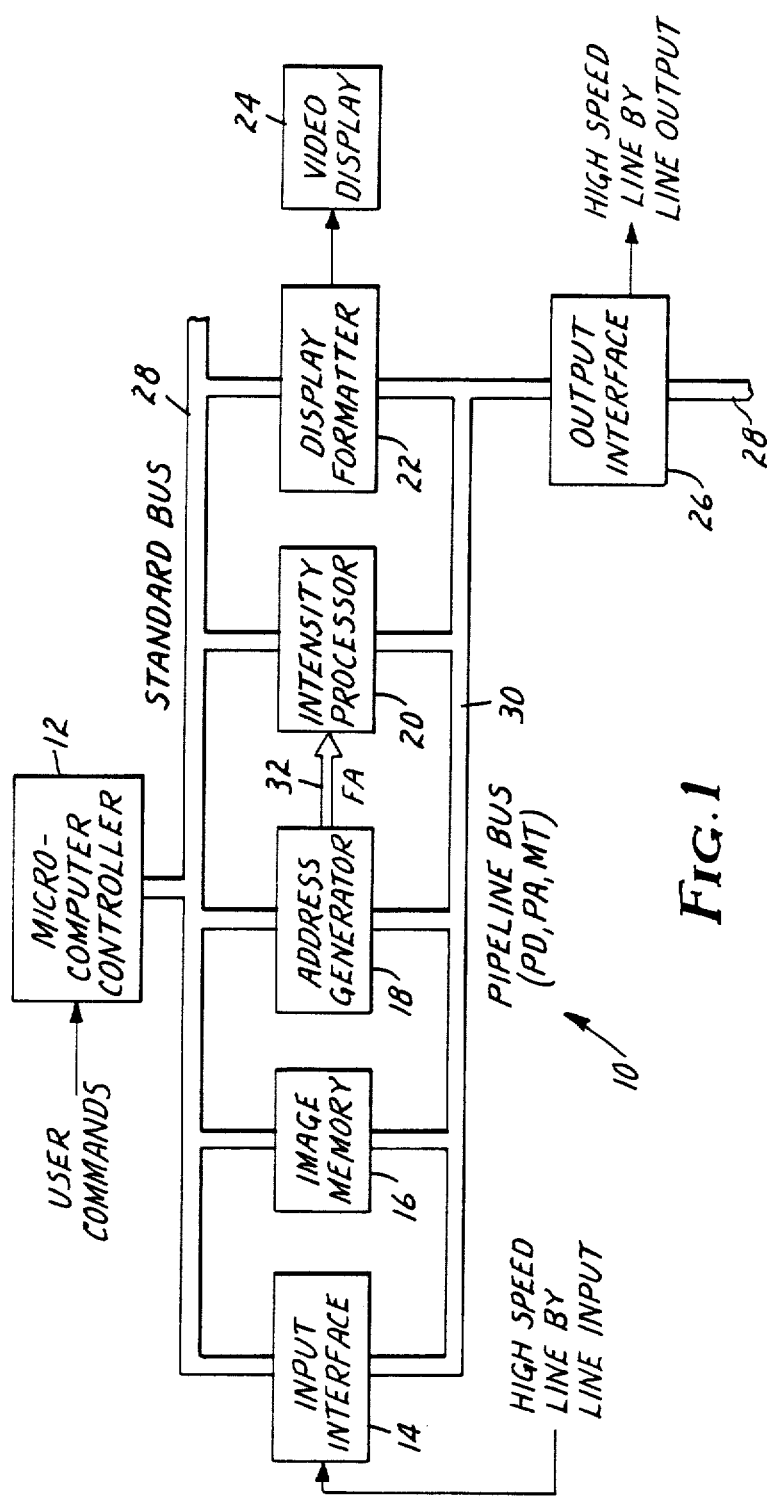
FIG. 1 is a block diagram of an image processor having a free flow pipeline bus of the present invention.

FIG. 1 shows digital image processor 10, which is a video rate, free flow pipelined image processor which uses the pipeline bus architecture of the present invention. In the embodiments shown in FIG. 1, digital image processor 10 includes microcomputer controller 12, input interface 14, image memory 16, address generator 18, intensity processor 20, display formatter 22, video display 24, and output interface 26. Communication among the components of image processor 10 is provided primarily over two separate buses: standard bus 28 and pipeline bus 30. Standard bus 28 is preferably an industry standard type of computer bus (such as VME or Multi-bus) and is used for communication of control information between microcomputer controller 14 and the other components of digital image processor 10.

The high speed transfer of digital image data, on the other hand, is provided over pipeline bus 30. As will be described in greater detail later, pipeline bus 30 includes pipeline address bus (PA) 34, pipeline data (PD) bus 36, and master timing (MT) bus 38, which are shown in FIGS. 2A–2C, respectively. All transfers of image data among the components of digital image processor 10 are conducted over pipeline bus 30.

Microcomputer controller 12 provides an interface between digital image processor 10 and the user. Depending on the particular user commands provided to microcomputer controller 12, it sends signals over standard bus 28 to the individual components to configure them to perform the desired image processing task.

Input interface 14 receives high speed line-by-line input image data, or other input image data, representing a digital image. The input data can be, for example, from a computer or from data storage devices.

Image memory 16 is a read/write memory which stores digital image data. Input data from input interface 14 is written into image memory 16 (as is processed image data from intensity processor 20). Image data is read from image memory 16 to provide input to intensity processor 20 and to provide output to display formatter 22 and output interface 26.

Address generator 18 generates the stream of addresses ove pipeline bus 30 which address image memory 16 to cause digital image data to be transferred; for example, from image memory 16 to intensity processor 20 for processing. In addition, address generator 18 communicates directly with intensity processor 20 over functional address lines 32 to control the functional image processing operations being performed by intensity processor 20.

Display formatter 22 converts digital image data to display drive signals which drive video display 24. In one embodiment video display 24 is a raster scan video monitor, display formatter 22 converts the digital image data representing individual pixels of the display into analog video signals used by video display 24. Display formatter 22 preferably permits asynchronous operation of video display 24 with respect to the remainder of digital image processor 10. By eliminating the need to synchronize operation to the video sync rate of video display 24, a free flow stop/start transfer of data over pipeline bus 30 is possible.

Output interface 26 allows digital image processor 10 to communicate with other digital equipment by a high speed line-by-line transfer of data. The format of the data being transmitted by output interface 26 is, in one embodiment, similar to the format of data being received by input interface 14.

Intensity processor 20 performs pipelined image pixel intensity computations based on input data received from image memory 16 and functional addresses received from address generator 18. In preferred embodiments, intensity processor 20 uses adaptive finite impulse response (FIR) filtering to perform a wide variety of different intensity computations.

To increase the efficiency of data transfer over pipeline bus 30, image data is transferred by sub-image blocks. Each block is an N×N square of spatially contiguous pixels. In the preferred embodiment of the present invention which will be discussed, the sub-image block is a 4×4 block -- i.e. each block represents sixteen pixels.

Figure 3:
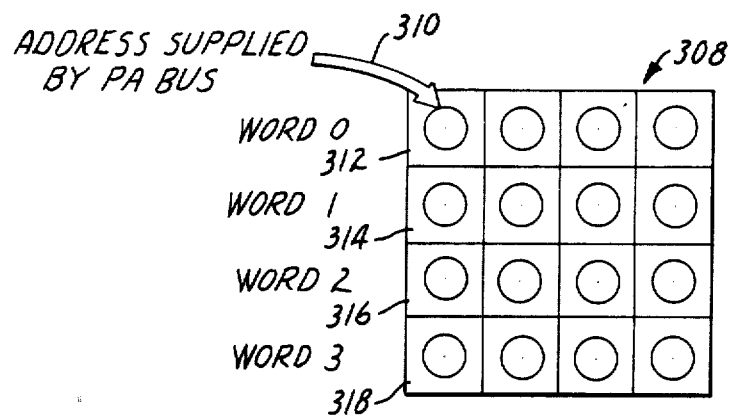
FIG. 3 illustrates schematically a 4×4 pixel subimage block used in the image processor.

Instead of addressing each individual pixel of the image data within image memory 16, only a single address (310) is required. In a preferred embodiment of the present invention, this address (310), represents the upper lefthand pixel of each 4×4 pixel block (308), as illustrated schematically in FIG. 3 By addressing sixteen pixels with a single address (308), more efficient transfer of data at higher speed is achieved. In one embodiment of the present invention, up to four operations (reading or writing) each are performed at 2.5 mega operations per second, with each operation representing the addressing of a sixteen-pixel block. This corresponds to a rate of 40 mega pixels per second/per operation, for a total of 160 mega pixels per second.

In the preferred embodiment which will be described in detail, each pixel is represented by eight bits. The 4×4 pixel square is transmitted over pipeline bus 30 as four 32-bit sequential words. "Word 0" represents the top row (312) of the 4×4 block and is a 32-bit word formed by the four 8-bit pixels of the top row. Similarly, "word 1", "word 2", and "word 3" are 32-bit words formed by a row of four 8 bit pixels. "Word 3" represents the bottom row of the block.

2. Pipeline Bus 30

Pipeline bus 30 has three major parts, pipeline address (PA) bus 34, pipeline data (PD) bus 36, and the master timing (MT) bus 38. Depending on the number of components to be connected to pipeline bus 30, and the particular processing requirements, more than one PA bus 34 and more than one pipeline data (PD) bus 34 is provided. In the preferred embodiment which will be described, pipeline bus 30 includes two PA buses 34A and 34B, and six PD buses 36A-36F. PA bus 34 of FIG. 2A and PD bus 36 of FIG. 2B are typical of each PA and PD bus in pipeline bus 30.

PA bus 34 carries physical addresses in image memory 16 of bit-mapped data, as well as control and routing information for that data. PA bus 34 initiates operations that will occur over one or more of the PD buses 36. PA bus 34 is a tri-stated bus which is terminated to the high logic state at its physical start and end points.

Figure 4:
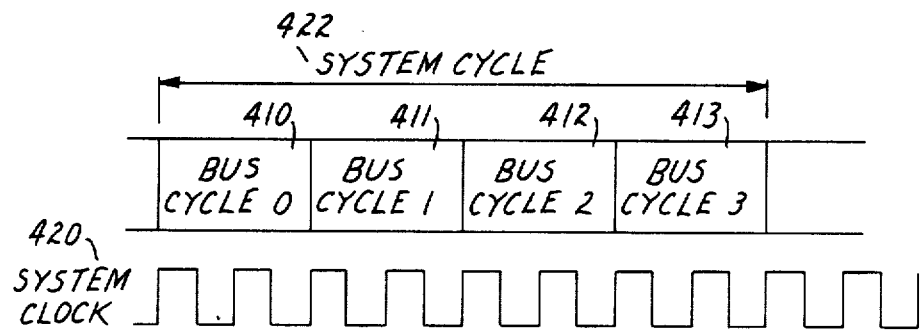
FIG. 4 is a diagram illustrating the relationship of system cycles, bus cycles and the system clock in a preferred embodiment of the system of FIG. 1.

A bus cycle on PA bus 34 is the equivalent of two system clocks, as illustrated in FIG. 4. A bus cycle is the duration that a single address is resident on PA bus 34.

A system cycle (422), as shown in FIG. 4 is a time period that is four bus cycles (410-413) in duration. The system cycle 422 defines the periodicy of PA bus 34. Each bus cycle (410-413) of the system cycle (422) is designated as Bus Cycle 0 (410), Bus Cycle 1 (411), Bus Cycle 2 (412), or Bus Cycle 3.

The components which use the PA bus 34 are either PA masters or PA slaves. A PA master is the source of data on PA bus 34. A PA slave is the recipient of data on PA bus 34. All PA slave responses occur two system cycles (422) after the system cycle (422) in which the PA master initiated the operation.

PA bus 34 is a fixed four-to-one time division multiplexed bus with fixed masters activated each bus cycle (410-413) of system cycle (422). In other words, each PA master has a designated time slot (one of the bus cycles (410-413)) in each system cycle (422).

As shown in FIG. 2A, PA bus 34 has a total of 35 lines, including 26 address lines and 9 control lines. "X" physical address lines XP0-XP12 (212) and "Y" physical address lines YP0-YP12 (212) are asserted by the PA master. When the operation involves image memory 16, the input/output line I/O (212)is set by the PA master to "0". In that case, lines XP0-XP12 (210) define an X physical address in image memory 16 (corresponding to the X coordinate of the upper lefthand pixel of the desired 4×4 subimage block). Similarly, lines YP0-YP12 (212) define a Y physical address in image memory 16 corresponding to the Y coordinate of the upper left hand pixel of the 4×4 subimage block.

If input/output line I/O (220) is set to "1" by the PA master, the operation is a parameter passing operation. In that case, lines Xp0-Xp12 (210) correspond to bits 0-12 on standard bus 28, and lines YP0-YP10 (212)

correspond to bits 13–23 of standard bus 28. In that case, YP11 and YP12 (of 212) are not used.

The not parallel address ready (NPAR) line (214) is a control or handshake line which is asserted by the master and is used to indicate that a valid parallel address is present on PA bus 34. When the NPAR line (214) is "0", a valid parallel address is present. When the NPAR line (214) is "1", this indicates that PA bus 34 is inactive.

Figure 5:
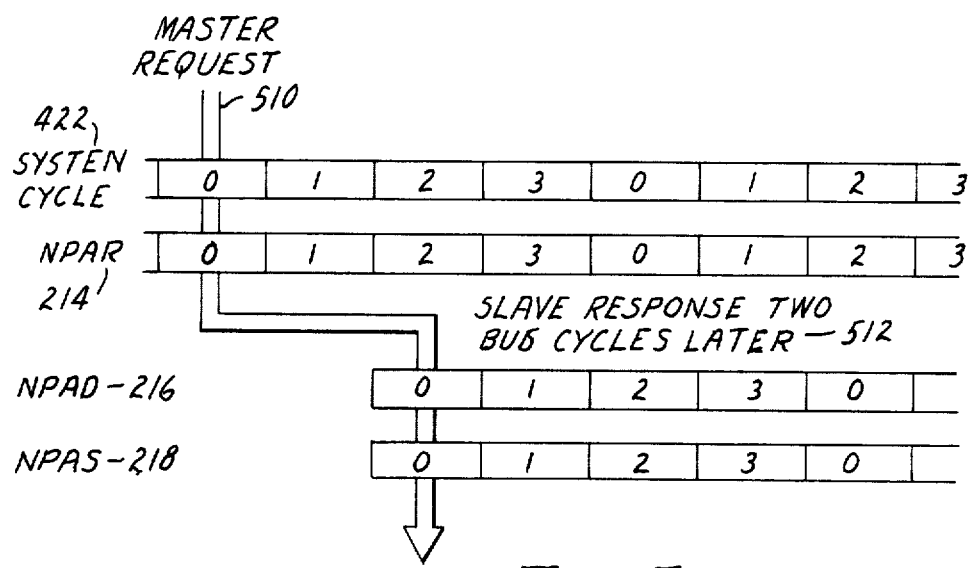
FIG. 5 is a diagram showing PA master requests and PA slave responses on the PA bus of FIG. 2A.

Two system cycles after a pA master has placed a valid parallel address on PA bus 34, the PA slave to which it is directed is required to respond by asserting the not parallel address detected (NPAD) line (218) and the not parallel address sync (NPAS) line. FIG. 5 shows schematically a PA master's request (510) and a PA slave's response (512) two system cycles later.

When the NPAD line (216) is "0", it indicates that the address has been detected by a PA slave. When the NPAD line (216) is "1", it indicates that an address has not been detected.

The NPAS line (218) permits multiple PA slaves to synchronize to a single PA master. When the NPAS line (218) is "0", it represents a pA slave request to the PA master to hold the address which had been asserted on the XP0–XP12 (210) and YP0–YP12 (212) lines. The PA master is required to repeat that address during its turn in the next system cycle. When the NPAS line (218) is "1", it indicates that all PA slaves are ready.

The read/write (R/W) line (220) is asserted by the master. A "1" on the R/W line (220) designates a read operation, and a "0" designates a write operation.

As discussed previously, the input/output line (I/O) (222) indicates whether the operation is involving image memory 16 or is a parameter passing operation. A "0" on the I/O line (222) designates the operation as involving image memory 16, while a "1" designates a parameter passing operation.

The operation mode (MODE) line (224) is also asserted by the PA master. A "0" on the MODE line(224) designates a non-interlaced transfer, and a "1" indicates an interlace transfer. The I/O (222) and MODE (224) lines are used to select the format for data transferred over PD bus 36. The operation of these formats will be described in more detail in the context of PD bus 36.

In preferred embodiments of the present invention, image memory 16 is capable of storing multiple planes of pixel data. The same two-dimensional X and Y address coordinates apply to each plane. Multiple planes are used, for example, where three- or four-color image data has been scanned and stored. In that case, each plane represents one color. In a three-color application, there are three planes which can be simultaneously or individually addressed using the same X and Y coordinates, simply by altering the P0 (226), P1 (228) and PG (230) lines. The plane number lines P0 (226) and P1 (228) define a two bit number. The plane group (PG) line (230) selects either single plane operation (when it is "0") or multiple-plane operation (when it is "1"). For multiple-plane operation, the PG line (230) is "1", indicating that all planes from "0"through the plane number are to be addressed with the same X and Y address coordinates.

If the PG line (230) is "0", the plane number defined by P0 (216) and P1 (228) is simply the plane to be used for the particular operation. If the PG line (230) is "1", the plane number designates the final plane of the plane group to be used in that operation. The plane number lines P0 (226) and P1 (228) and the PG line (230) are asserted by the PA master.

Pipeline data (PD) bus 36 shown in FIG. 2B contains bit mapped image or graphics data for transmission between components of image processor 10 and preferably is connected to internal parameter registers of each component for the passing of control parameters. PD bus 36 is a tri-stated bus which is terminated at the high state at its physical start and end points.

The components which use PD bus 36 can be classifed as PD masters and PD slaves. A PD master is a device that controls transfers on PD bus 36. All PD masters are unconditionally in control of the PD bus during their time slot. Each PD master must know a priori the PD slaves which are unconditionally on PD bus 36.

A PD slave is a device that responds to a PD master's request. A PD slave is conditionally on PD bus 36 during a time slot and is activated by a valid address appearing on PA bus 34. Each PD slave must know internally which PD bus to use for every access code on PA bus 34.

As with PA bus 34, the operation of PD bus 36 is defined in terms of bus cycles and system cycles (410–413). The bus cycle is the equivalent of two system clocks (420), and there are four bus cycles (410–413) in a system cycle (422). All operations on PD bus 36 take a full system cycle (422) to occur.

All system cycles (422) occur on a pair-wise basis on the PD bus 36. These cycle pairs (616) are broken into odd (612) and even (614) cycle, as illustrated in Fig. 6. A PD master may be in one of four states at any instant. If both the evern (614) and odd (612) cycles are unconditionally off, the PD master is off the PD bus 36. If the even cycle (614) is unconditionally on and the odd cycle (612) is unconditionally off, the PD master uses only the even cycle (614) for data transfer. Conversely, if the even cycle (614) is unconditionally off and odd cycle (612) unconditionally on, the master uses only the odd cycle (612) for data transfer. Finally, if both the even (614) and odd (612) cycles are unconditionally on, the master uses both cycles (612 and 614) for data transfer.

As shown in FIG. 2B, PD bus 36 contains 40 lines— thirty-two line thirty-two bits of parallel data. PD00–PD07 (232) define parallel data byte 0. PD10–PD17 (234) define parallel data byte 1. PD20–PD27 (236) define parallel data byte 2. PD30–PD37 (238) define parallel data byte 3.

The source of the data for data bytes 0–3 is (232, 234, 236, 238) is determined by the state of the read/write (R/W) line (220) of PA bus 34. If the R/W line (220) is "0", the source of the data bytes is the PD master (since this is a write operation). Conversely, if the R/W line (220) is "1" (indicating a read operation), the source of the data bytes on PD bus 36 is the PD slave. By using the not write byte lines NWB0-NWB3 (246, 248, 250, 252), either the PD master or the PD slave (in the case of a write or read operation, respectively) can determine whether or not particular data bytes are to be used, modifiable on a 4×4 block-by-block basis. If one of the not write byte lines (246, 248, 250, 252) (for example NWB1 (248)) is a "0", this means that data byte "1" is valid data. Conversely, if NWB1 line (248) is 1, the source of the data has indicated that data byte 1 is not to be used during this operation.

The transfer of data over PD bus 36 is in different formats, depending on the state of the I/O and MODE (224) lines of PA bus 34. If the I/O line (222) is "1", the thirty-two bits of data appearing on lines PD0–PD7 (232), PD10–PD17 (234), PD20–PD27 (236), and PD30-PD37 (238) remain constant over the entire system cycle (422). This is a parameter passing operation, and the address appearing on PA bus 34 is derived from standard bus 28.

When the I/O line (222) is "0" meaning that the operation involves image memory 16, the thirty-two bits of data appearing on PD bus 36 are updated every bus cycle (410-413) within the system cycle.

Figure 7A:
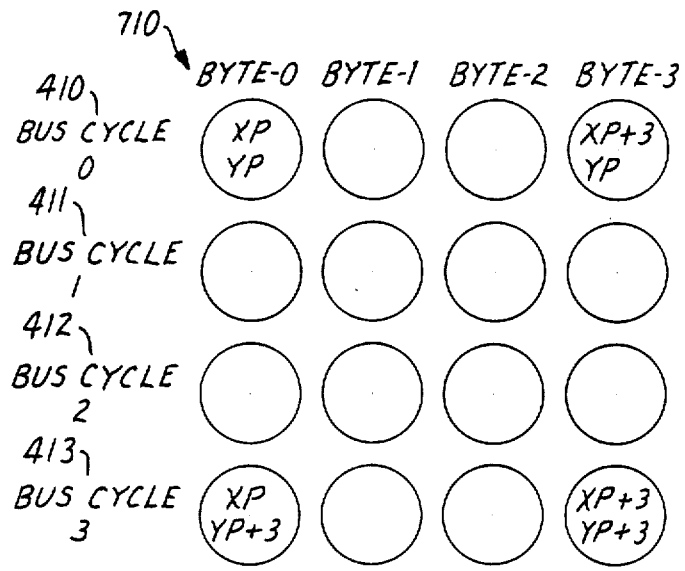
FIGS. 7A and 7B are diagrams illustrating the arrangement of pixel data transferred in a 4×4 contiguous block and 2×8 interlaced block transfer formats, respectively.
Figure 7B:
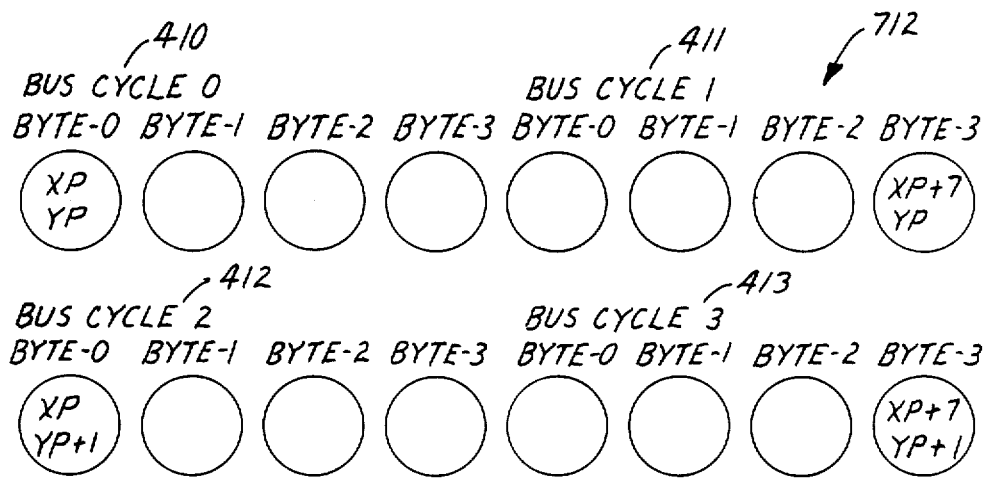

The MODE line (224) of PA bus 34 selects whether the thirty-two bits data transferred when the I/O line (222) is "0" are in form of a 4×4 pixel contiguous region or is in the form of a 2×8pixel interlaced region. FIG. 7A shows the 4×4subimage block (710) which is passed when the MODE, line (224) is "0". This is the standard subimage block (710) used for transferring data over pipeline bus 30. FIG. 7B shows the 2×8 interlaced region (712) which is transferred when the MODE line (224) is "1".

The remote data enable (RDE) (254) line of PD bus 36 is used for communication with a remote slave through input interface 14. When the RDE line (254) is "0" and the R/W line (220) of PA bus 34 is "0" the PD master asserts data over PD bus 36. Conversely, if the RDE line (254) is "1" and the R/W line (220) of PA bus 34 is "1", the PD master receives data from the remote slave over PD bus 36.

Figure 8:
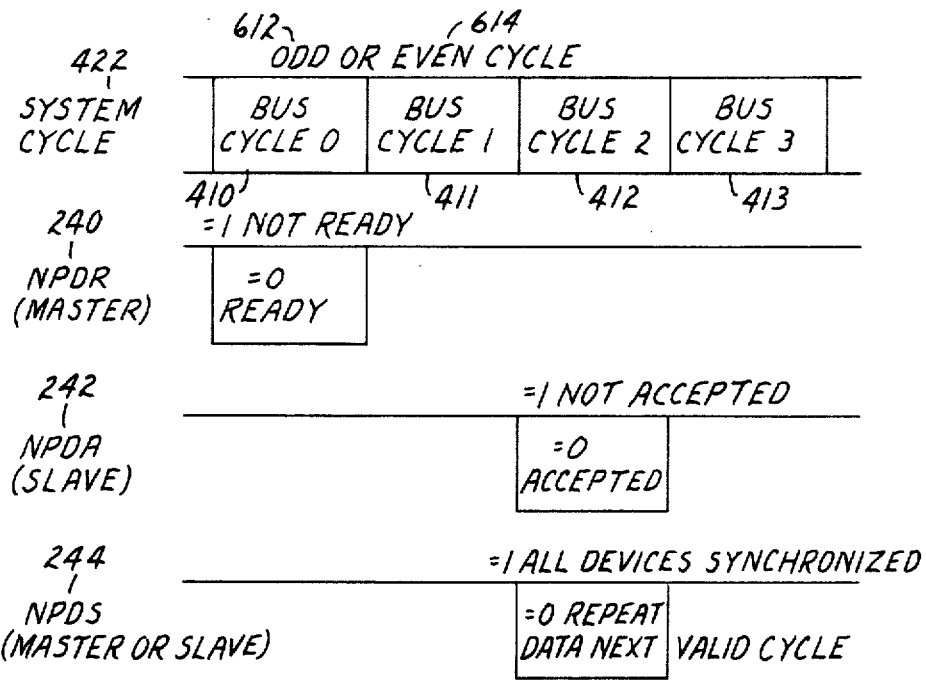
FIG. 8 is a timing diagram showing system cycles and the states of handshake lines of the system of FIG. 1.

PD bus 36 includes three handshake lines: the not parallel data ready (NPDR) line (240); the not parallel data accepted (NPDA) line (242); and the not parallel data sync (NPDS) line (244). The states of these three lines during a typical system cycle is illustrated in FIG. 8.

The NPDR line (240) is asserted by the PD master and indicates whether or not the PD master is ready to either accept data or to transmit data. A "1" on the NPDR line (240) indicates that the PD master is not ready, while a "0" indicates that the PD master is ready.

If the PD slave has accepted the data or has placed valid data on the data lines of PD bus 36, it will cause the NPDA line (242), to drop from "1" to "0". A "1" on the NPDA line (242) means that the PD slave has not accepted data or has not placed data on the data lines. Because the NPDA signal (242) is a pulse, in the pipelined architecture of the present invention there is time to either place new data on the PD bus 36 at the next Bus cycle (410-413) - or to repeat the same data again. As shown in FIG. the PD master always asserts the NPDR and the PD slave always asserts the NPDA line (242) at the appropriate bus cycle time (e.g. Bus cycle 2) (412) to allow the PD master to react to the status.

If any component on PD bus 36 determines that it wants to abort the data transfer for any reason, it drops the NPDS line during Bus cycle 2 (412). Either a PD master or a PD slave can assert the NPDS signal (244). As long as the NPDS line (244) is "1" all components are ready for data. If the NPDS line (244) is "0", this constitutes a request by the asserting device that the PD master hold the data for this system cycle (422) and repeat it the next valid system cycle (422).

This is particularly important where there are multiple PD slaves on a given PD bus 36 at one time. If any PD slave feels that it is not prepared for a particular transfer, it can drive the NPDS line (244) low ("0") and essentially abort the whole system cycle (422) for all components. Once all of the components agree that they are ready for the transfer of data, the NPDS line (244) will remain "1" for the entire system cycle (422) and the system cycle (422) will proceed normally. This forces a synchronization on PD bus 36 so that all transfers are always completely valid transfers of data regardless of the number of PD slaves on the PD bus.

Figure 9A:
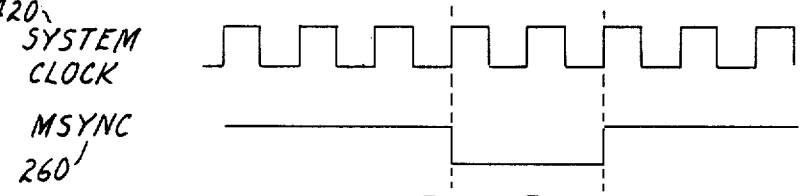
FIGS. 9A/ and 9B show master bus timing signals of the system, of FIG. 1.

As shown in FIG. 2C, master timing (MT) bus 3B includes system clock lines SCKLK+(256) and SCKL−(258) a master sync (MSYNC) line, and a system initialize (SINIT) line (262). SCLK+(256) and SCKL−(258) are positive and negative polarities of a differential ECL system clock signal which, in a preferred embodiment, operates at 20 Mhz. The MSYNC signal (260) shown in FIG. 9A, dictates the beginning of a timming cycle.

Figure 9B:
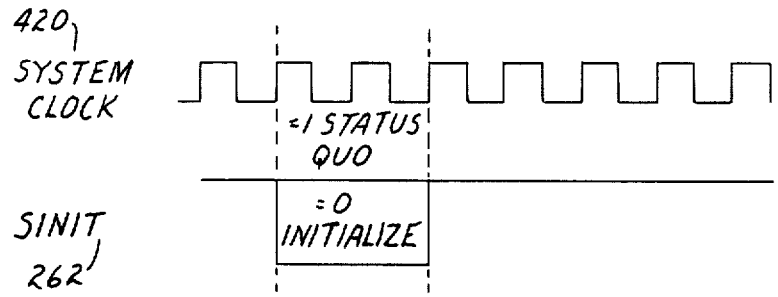

The SINIT signal (262) shown in FIG. 9B is an initialization signal for the entire system. Normally, the SINIT signal (262) is "1". When an initialization is to take place, SINIT (262) is "0" for two system clocks (420).

3. Address Generator 18

In the embodiment of the present invention shown in FIG. 1, address calculation and generation and data calculation are performed separately in address generator 18 and intensity processor 20, respectively. In order to maintain high throughputs with a pipeline architecture, image processor 10 of the present invention preferably pipelines both address calculations as well as data calculations. As a result, the generation of addresses is not a limiting factor in high speed operation.

As described previously, PA bus 34 has a free flow characteristic, meaning that an address placed on PA bus 34 is assigned to a time slot in the pipeline. If that address cannot be immediately accepted by image memory 16, handshaking takes place which allows the same address to again be placed on PA bus 34 at the next occurrence of its time slot. This may be repeated as many times as required for the address to be accepted. This free flow characteristic, therefore, effectively results in starting and stopping of PA bus 34.

Figure 10:
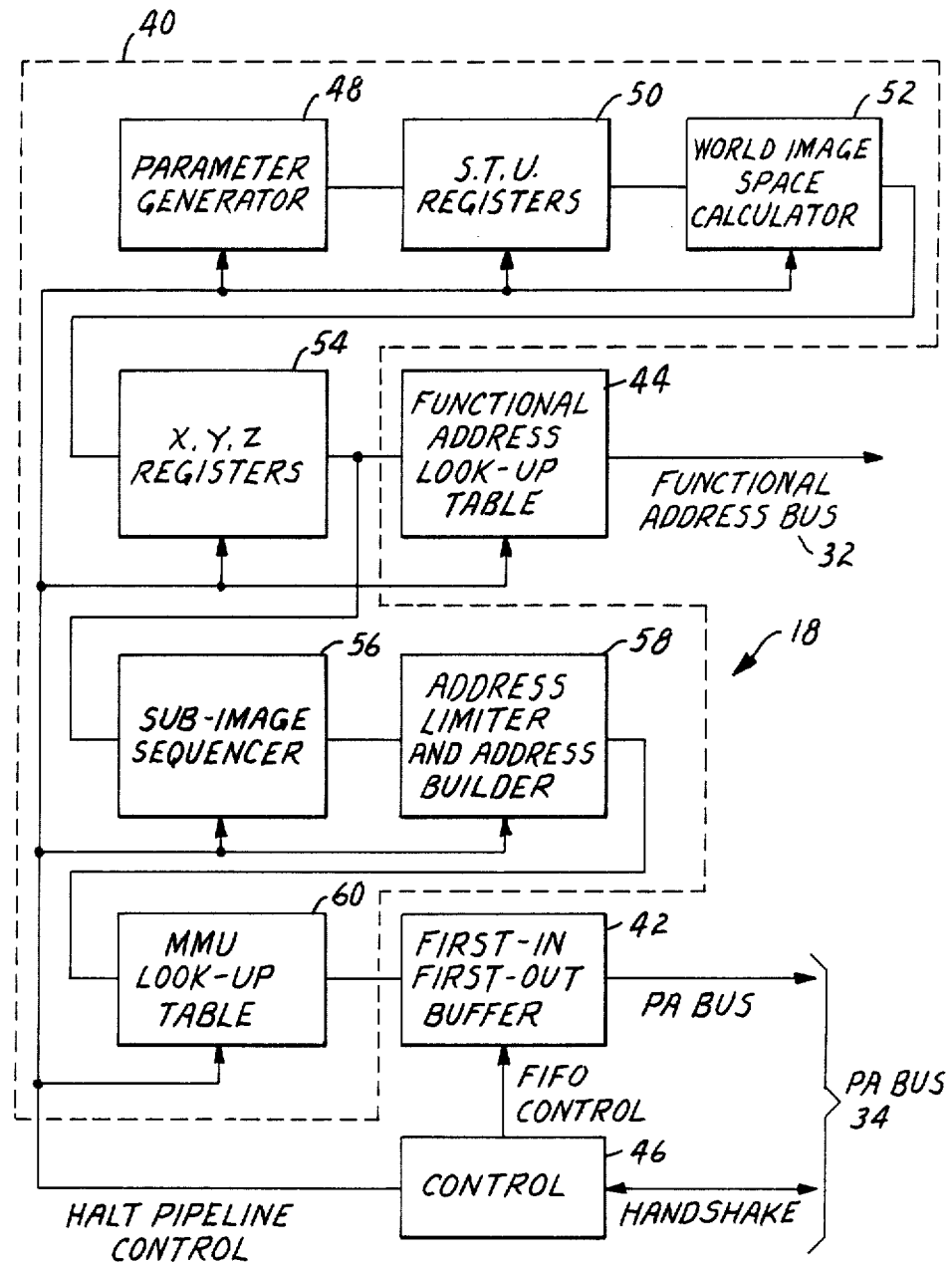
FIG. 10 is a functional block diagram of the address generator of the system of FIG. 1.

FIG. 10 shows a preferred embodiment of address generator 18, which is a pipelined address generator having a stop/start capability so that it is compatible with the free flow characteristic of pipeline bus 30.

In the embodiment shown in FIG. 10, address generator 18 includes address pipeline 40, first-in, first-out (FIFO) buffer 42, functional address generator 44, and control 46. Address pipeline 40 generates addresses at a high rate of speed through a pipelined architecture, and may be stopped on demand by control 46. Addresses are calculated parametrically by address pipeline 40 and are supplied to FIFO buffer 42, which interfaces with the address lines of PA bus 34. FIFO buffer 42 is a first-in, first-out memory that absorbs the speed variations between the starting/stopping of PA bus 34 and the starting/stopping of address pipeline 40. Control 46 interfaces with the handshake lines of PA bus 34 and provides control signals to address pipeline 40, FIFO buffer 42, and functional address lookup table 44. When the PA bus 34 stops and FIFO buffer 42 begins to fill, control 46 halts address pipeline 40.

Address pipeline 40 includes parameter generator 48, S T U registers 50, world image space calculator 52, X Y Z registers 54, subimage sequencer 56, address limiter and address builder 58, and memory management unit (MMU) 60.

The head of the address pipeline is parameter generator 48. This is where addressing coordinates S, T and U are calculated by an additive process. In the embodiment of address generator 18 shown in FIG. 10, parametric calculation of addresses is performed directly, rather than by an accumulative technique used in prior art image processors. By direct calculation, each address is calculated separately, without reliance on previous addresses. As a result, no accumulated errors are produced.

Parameter generator 48 passes the S, T and U parameters which it has calculated to S T U registers 50. World image space calculator 52 draws the S T U coordinates from registers 50 and converts them to X Y Z coordinates (as needed) by use of parametric equations calculated by a multiply and add process. The output of world image space calculator 52 is stored in X Y Z registers 54.

The output of X Y Z registers 54 is supplied to subimage sequencer 56, where an M x M block of addresses are constructed around the (X Y Z) base address by a counting process. The X Y Z coordinates are not memory locations, but rather are logical addresses. Subimage sequencer 56 allows the address pipeline 40 to create a subimage which, rather than being a 4×4 block, may be 8×8, 12×12 or 16×16 pixels depending on the particular operation to be performed.

Address limiter and address builder 58 separate the X Y Z address into required and nonrequired bits. The required bits are arranged to build a two-dimensional or three-dimensional virtual address. The nonrequired bits are combined to form an overflow detection feature.

MMU 60 is preferably a lookup table where the virtual or logical address from address limiter and address builder 58 is mapped into a physical address space within image memory 16. The output of MMU 60 is a physical address which is supplied to FIFO buffer 42 and ultimately on to PA bus 34.

Functional address lookup table 44 also uses the X Y Z coordinates from registers 54 to produce a functional address on functional address bus 32. This functional address is supplied to intensity processor 20 and are used to select filter coefficients used by intensity processor 20 (as will be described in further detail later). The rate at which functional address bus 32 is supplying functional addresses can vary from the rate of PA bus 34. In preferred embodiments, however, intensity processor 20 has a FIFO buffer for receiving functional addresses, so that the functional addresses supplied by address generator 18 over functional address bus 32 correspond to data being supplied to intensity processor 20 over pipeline bus 30.

Address generator 18 shown in FIG. 10, with its parametric pipeline address generation, is capable of performing very complex address generation functions without speed degradation. It also allows PA bus 34 to operate at whatever speed is required, without any loss of pixel data or address data or any reduction in the functionality of the address calculation functions. This interfacing is achieved throuh FIFO buffer 42 and control 46 together with the handshake lines of PA bus 34.

The particular address generation which is performed will, of course, depend upon control commands from microcomputer 12 which are received by address generator 18 over standard bus 28. These command load registers (not shown) define coefficients, upper and lower bounds of parameters, and parameter increment values used by address pipeline 40 in the calculation of coordinates, and ultimately of the addresses which are supplied over PA bus 34.

4. Image Memory 16

Figure 11:
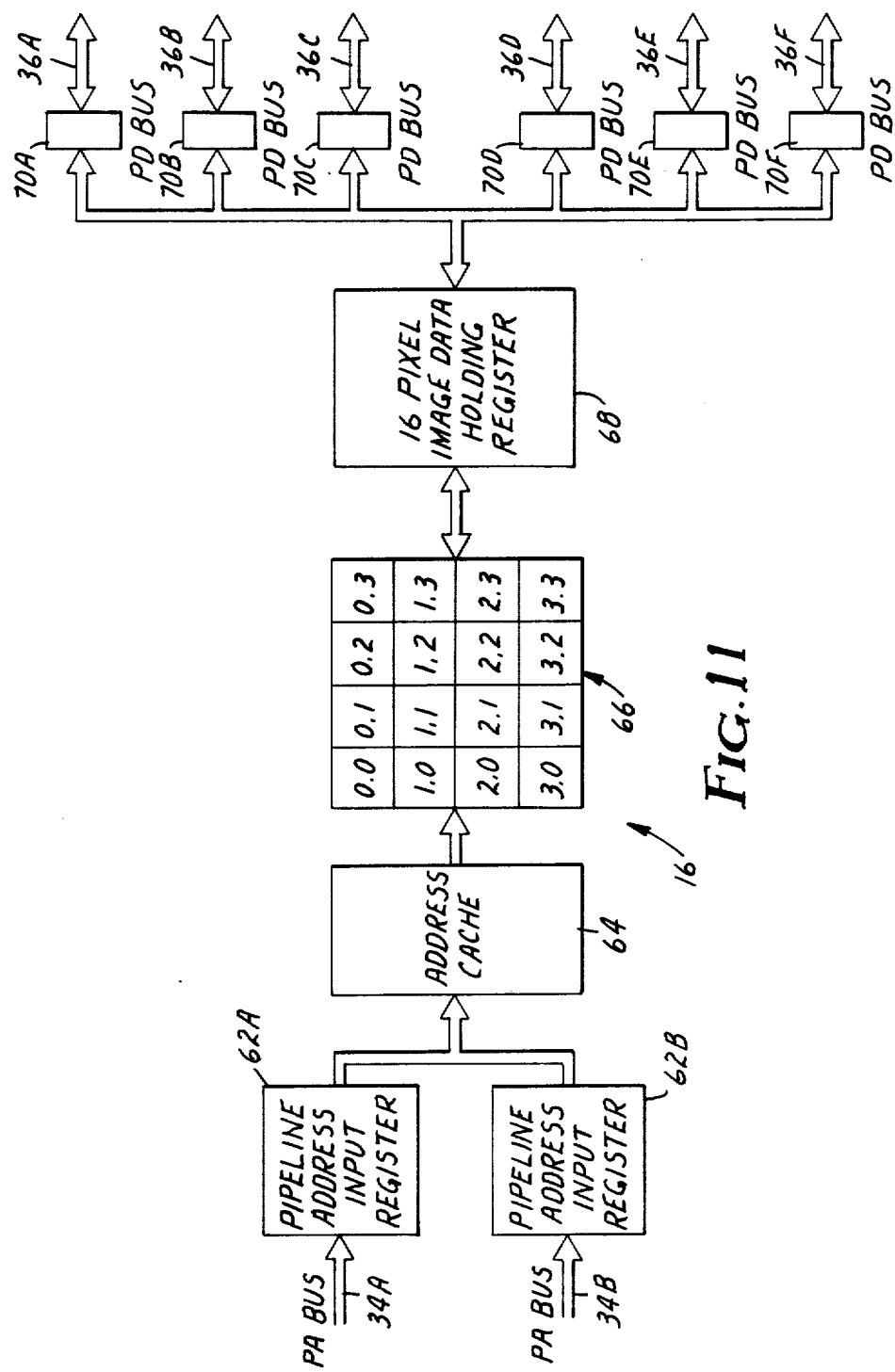
FIG. 11 is a functional block diagram of the pipelined image memory of the system of FIG. 1.

FIG. 11 is a functional block diagram of image memory 16, which functions as a pipelined image memory tile. In the embodiment shown in FIG. 11, image memory 16 includes pipeline address input registers 62A and 62B, address cache 64, DRAM memory 66, holding register 6B, and data ports 70A-70F. In this embodiment, image memory 16 interfaces through input registers 62A and 62B with two PA buses 34A and 34B, respectively. Through output data ports 70A-70F, image memory 16 interfaces with six PD buses 36A-36F, respectively.

Pipeline address received from address generator 18 over PA buses 34A and 34B are received by input registers 62A and 62B provided to address cache 64. In a preferred embodiment, address cache 64 is a first-in, first-out type of memory. When address cache 64 fills so that there are too many addresses, it refuses further addresses over PA buses 34A and 34B.

All addresses are examined and either ignored, accepted (entered into address cache 64), or rejected with a repeat request using the NPAS line of PA bus 34A or 34B to indicate a not ready condition.

If a read operation is to be performed (as indicated by the R/W line of PA bus 34A or 34B), addresses from address cache 64 are read into DRAM 66 where they are adjusted for spatial continuity. A sixteen-pixel word in a 4×4 square configuration of spatially contiguous pixels is loaded into holding register 68. Once in holding register 68, the 4×4 pixel block is placed out on one of the six PD buses 36A-36F using the format described in FIG. 7A.

During a write operation, data representing a 4×4 pixel block is taken from one of the data ports 70A-70F and loaded into holding register 68. An address from address cache 64 is then loaded into DRAM array 66 and adjusted for its spatial continuity to select the 4×4 pixel block into which the data is to be written.

The free flow characteristics of pipeline bus 30 is reflected in the operation of image memory 16. If the PD bus 36A-36F has slowed down due to handshaking, data will not be entering or exiting holding register 68 at as high a rate. This slows down the use of addresses from address cache 64. Since address cache 64 is not using addresses as rapidly, it will fill and begin rejecting further addresses on PA buses 34A and 34B so that PA buses 34A and 34B begin to slow down. In other words, handshaking on the PD buses 36A-36F will cause a slow down of memory fetches in the memory tile which causes a changing effect on PA buses 34A and 34B so that there is an interrelationship between the free flowing characteristics of the PD and PA buses.

An important feature of the images memory (16) is the ability to transmit spatially contiguous data in the 4×4 pixel format for any address received over the PA bus (defined by XPA0–XPA12 (210) and YPA0–YPA12) (212). Conventional buses permit only addresses that are integer multiples of the block size (or word size) of the bus. For example a thirty-two bit, four-pixel READ or WRITE on a conventional bus would permit only integer multiples of four to be received over the address bus. This can lead to severe performance degradation in some image processing functions because multiple READs would be required to form a region of computational dependency. In large data base systems, such as those typical of high resolution image processing, this must also be valid even when the image spans multiple memory cards. Since there is a spatial boundary between memory cards, multiple memory cards may be required to contribute a single 4×4 block transfer as shown.

In image memory 16 of the present invention a pixel at X, Y comes from the memory group M, N defined by:

$$M = \text{MODULO}(X,4)$$
$$N = \text{MODULO}(Y,4)$$
Eq. 1

Figure 11A:
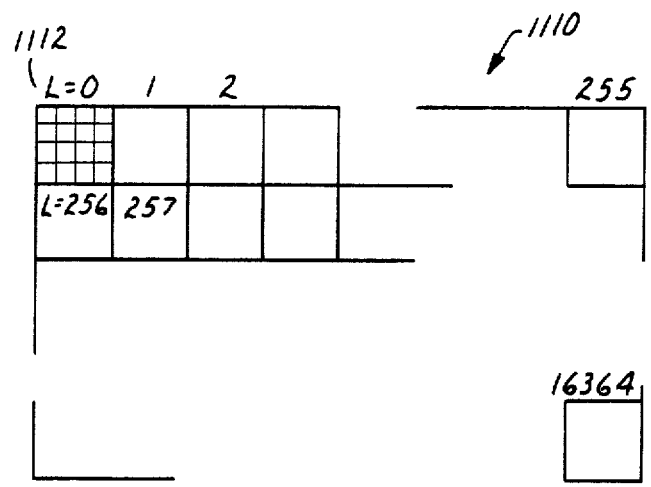
FIGS. 11A–11C illustrate the organization and operation of the image memory where concatenation is required.

A memory tile has its memory chips organized into the sixteen memory groups (*,*) through (3,3) shown in FIG. 11. A memory tile has a size defined by the number of memory chips and the size of the memory chip (i.e., 32 256K DRAMS creates a 1024×1024 memory title (1110). Each group (M,N) holds all of the pixels in the memory tile that are defined by Eq. 1 above, provided that X and Y are not greater than the size of the tile. These separate pixels are held within different locations (L) (1112) within the memory group as shown in FIG. 11A.

Figure 11B:
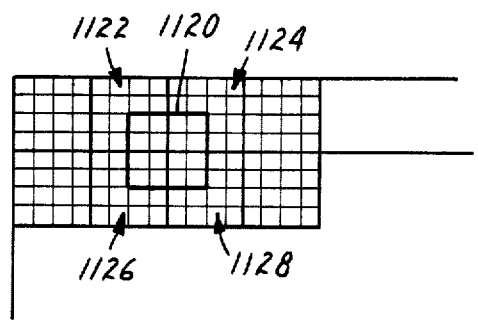

Spatially contiguous 4×4 subimage blocks are read/written from the memory tile by controlling the locations within each group. A single 4×4 subimage block (1120) may draw from as many as four different locations, (1122, 1124, 1126, 1128) within groups as shown in FIG. 11B.

When memory regions larger than a single memory tile are required, multiple memory cards (1130, 1132, 1134, 1136) can be abutted to create an effectively larger memory title (1138). This larger memory tile (1138) must be transparent to all cards (1130–1136) on the pipeline bus. An example is the creation of a 2048×2048 memory region (1138), from four 1024–1024 tiles, (1130–1136), as shown in FIG. 11C.

If a memory request requires a border region that overlaps multiple memory tiles, each memory title must contribute certain pixels to the 4×4 block (1140) as if the request was from the center of a tile. This process is the concatenation of memory tiles.

Figure 11C:
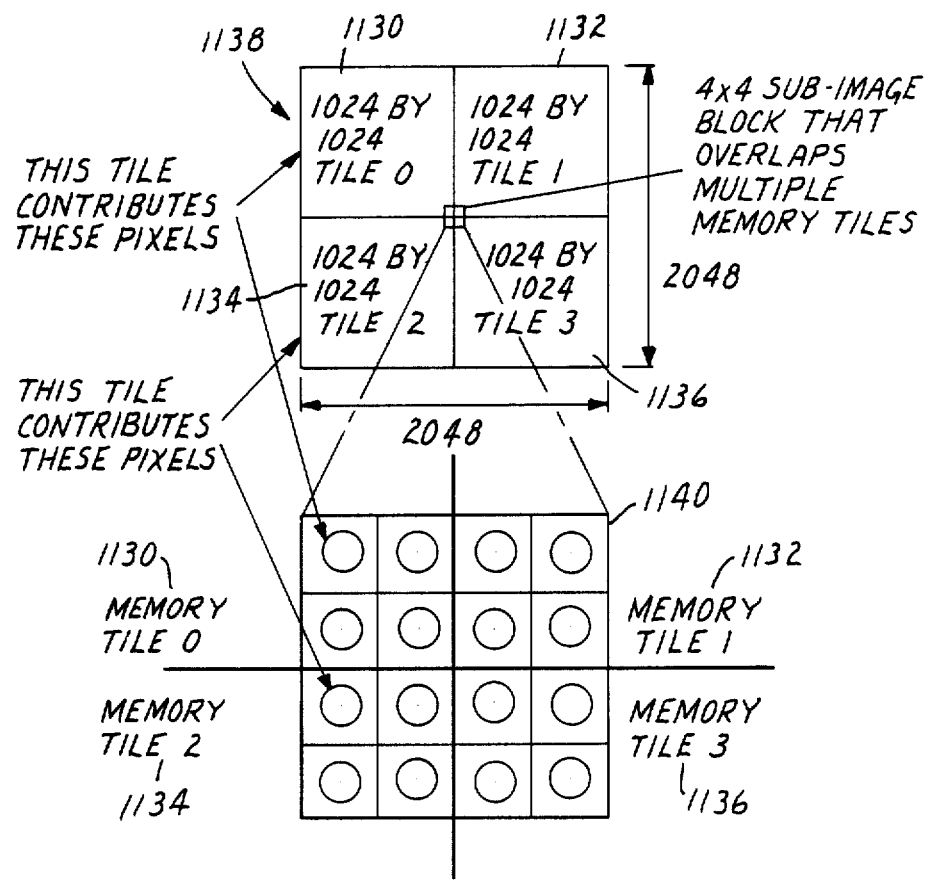

In general for a single 4×4 block (1140) up to four memory tiles (as illustrated in Figure 11C) may required to contribute to a single subimage block (1140) transfer, depending on the location of the block with respect to the boundaries of the memory tiles (1130–1136).

This is implemented as follows. Each memory tile (TILE *) (1130) decodes the PA address of itself and the three neighbors (TILES 1-3) (1132–1136) adjacent to it. It declares one of five states to exist: (1) not one of TILE *(1130), TILE 1 (1132), TILE 2 (1134), TILE 3(1136) (2) TILE *(1130) addressed; (3) TILE 1 (1132) addressed, (4) TILE 2 (1134) addressed, (5) TILE 3 (1136) addressed. If condition (1) is declared this memory tile does not participate in the operation. If one of conditions (2)–(5) exists memory tile must decide if it will be required to contribute to the corresponding PD bus transfer. This is accomplished by examining the lower address to see if it falls within a three-pixel border along the memory tile seams (boundaries).

If the address falls outside the three-pixel border, then no concatenation will occur. If it falls within the three-pixel border concatenation must occur. If concatenation must occur, the two least significant bits (LSB) of X, and the two least significant bits (LSB) of Y and the quadrant are stored internally in the memory tile and used to control the data when transmitted over the PD bus. The PD bus is controlled as follows:

If concatenation must occur, image memory 16 decodes the quadrant, the X LSBs, the Y LSBs and the bus cycle (0, 1, 2, 3) on the PD bus to identify which bus cycles and bytes the memory tile must be ON (contributing to the transfer) or OFF (letting another memory tile contribute to this transfer). This circuit causes the PD bus memory concatenation in such a way the receiving master device perceives no difference on the PD bus. The NPDS line is dropped if image memory 16 is not ready to contribute its data.

5. Intensity Processor 20

Figure 12:
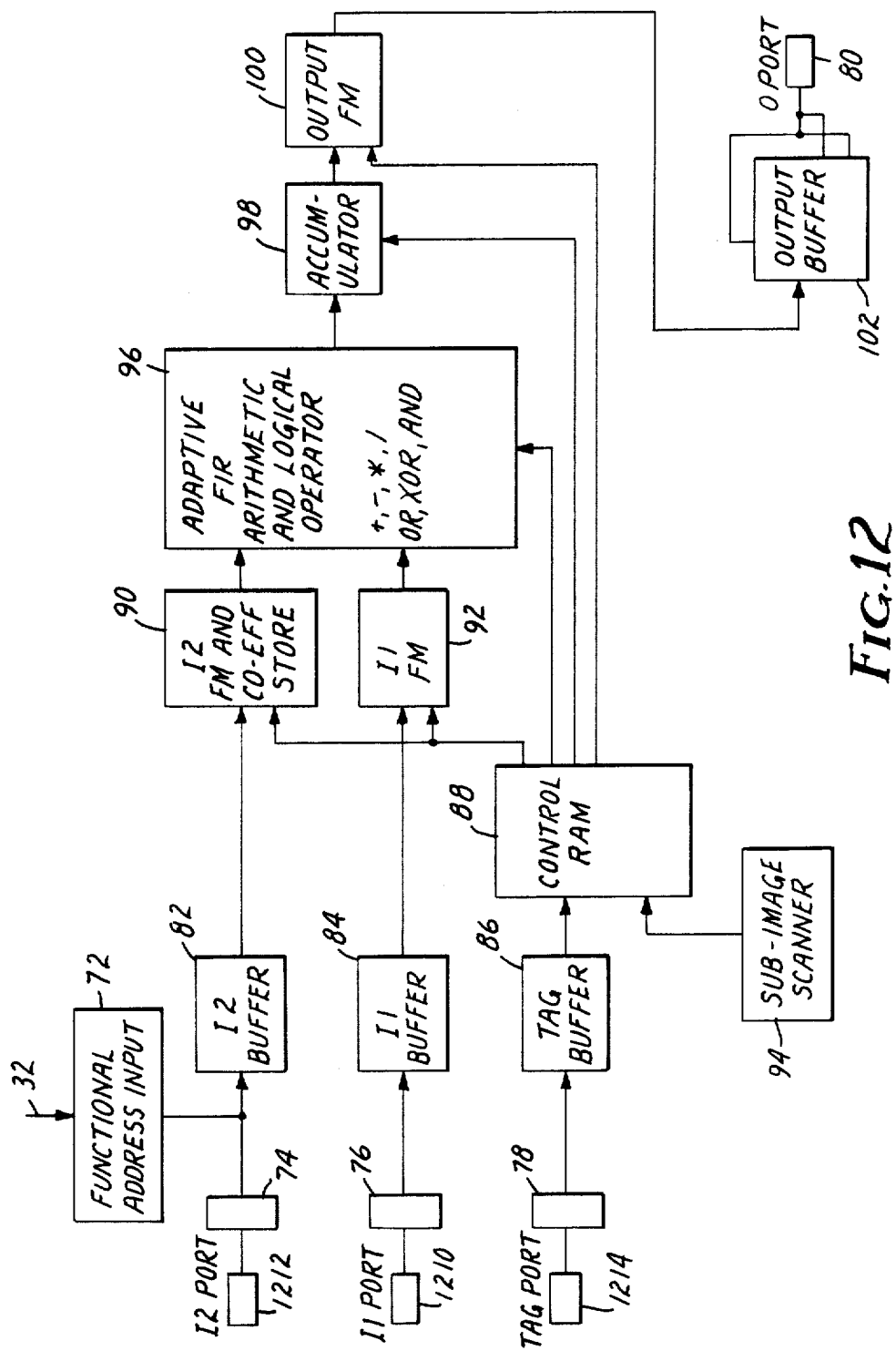
FIG. 12 is a functional block diagram of the intensity processor of the system of FIG. 1.

FIG. 12 is a functional block diagram of intensity processor 20. In this embodiment, intensity processor 20 is a circuit that performs pipelined image pixel intensity computations using adaptive finite impulse response (FIR) filtering. By changing filter coefficents, a wide variety of different intensity computation operations can be performed.

In the embodiment shown in FIG. 12, intensity processor 20 has four input ports (functional address input port 72, I2 port 74, I1 port 76, and TAG port 78) and one output port B0. Image processor 20 includes 12 buffer 82, I1 buffer 84, TAG buffer 86, control RAM 88, I2 functional memory and coefficient store 90, I1 functional memory 92, subimage scanner 94, adaptive FIR 96, accumulator 98, output functional memory 100, and output buffer 102.

The I1 (1210), I2 (1212) and TAG (1214) inputs are bit-mapped images received from image memory 16. All three inputs can be generated simultaneously with the same address from address generator 18 to image memory 16, or may be generated separately and transmitted over three of the four address channels on the PA bus without sacrificing throughput. In other words, I1 (1210), I2 (1212) and TAG (1214) represent different planes which can be addressed. The input images I1 (1210), I2 (1212) and TAG (1214) are received over three separate PD buses 36A–36C in subimage blocks with a 4×4 pixel square geometry. These subimage blocks are concatenated together to form larger subimages and then are fed into an arithmetic pipeline.

The functional address input is received over functional address bus 32 from address generator 18 and shares I2 buffer 82 with I2 port 74. The functional addresses select filter coefficients to be used by adaptive FIR filter 96. Filter coefficients that change with time are loaded into I2 functional memory and coefficient store 90 (which is implemented in a preferred embodiment as a look-up table) and are selected by the functional address (which is different depending on the address in the image).

The TAG image (1214) is fed into control RAM 88 that selects coefficients (tap weights) to be applied to the I1 (1210) and I2 (1212) images. In other words, the TAG input (1214) allows the intensity processing operation to vary on a pixel-by-pixel basis. The selection of coefficients by the functional addresses can also be affected by the TAG inputs (1214) through control codes supplied by control RAM 88 to store 90.

I1 function memory 92 and I2 function memory and coefficient store 90 are preferabl look-up tables which perform preprocessing of the I1 (1210) and I2(1212) images received from buffers 84 and 82, respectively. The particular function memory page of the look-up table used for preprocessing is based on control codes from control RAM 88, which are selected by the TAG inputs (1214). A typical form of preprocessing performed in FM 90 and FM 92 is gray scale transformation.

The subimage scanner 94 reads pixels in the region of computational dependency and inserts them into the pipeline through control RAM 88 in a sequential fashion. This allows variation of filter size weights based on computational dependency of surrounding pixels.

The arithmetic pipelines for I1 and I2 merge at adaptive FIR filter 96 where arithmetic and logical operations are performed and the results accumulated in accumulator 98. In the block diagram, FIR 96 includes a combiner for performing what may be termed "post filtering" combiner functions such as add, subtract, multiply, divide, OR, XOR and AND. These combiner functions are selected by combiner codes from control RAM 88 based on the TAG inputs. The final results are passed to output functional memory 100 and are stored in output buffer 102. Output buffer 102 acts as a first-in/first-out memory and permits pipelined intensity computations to occur. Upper buffer 102 is connected, through upper port 80, to pipeline data buses 36A–36F.

By using adaptive FIR filtering, function memories for preprocessing, and an arithmetic and logical combiner for postfiltering functions, intensity processor 20 is capable of performing a wide variety of different intensity processing computations which are selectable by address generator 18 under the control of microcomputer controller 12 and by the TAG inputs (1214). All that is required to change from one type of image processing to another is simply to change the coefficients or tap weights to the adaptive FIR filter, function memory pages, and/or combiner codes. These tap weights, function memory and combiner codes can be changed through the functional addresses produced by address generator 18, and also are varied by the TAG input.

6. Display Formatter 22

Figure 13:
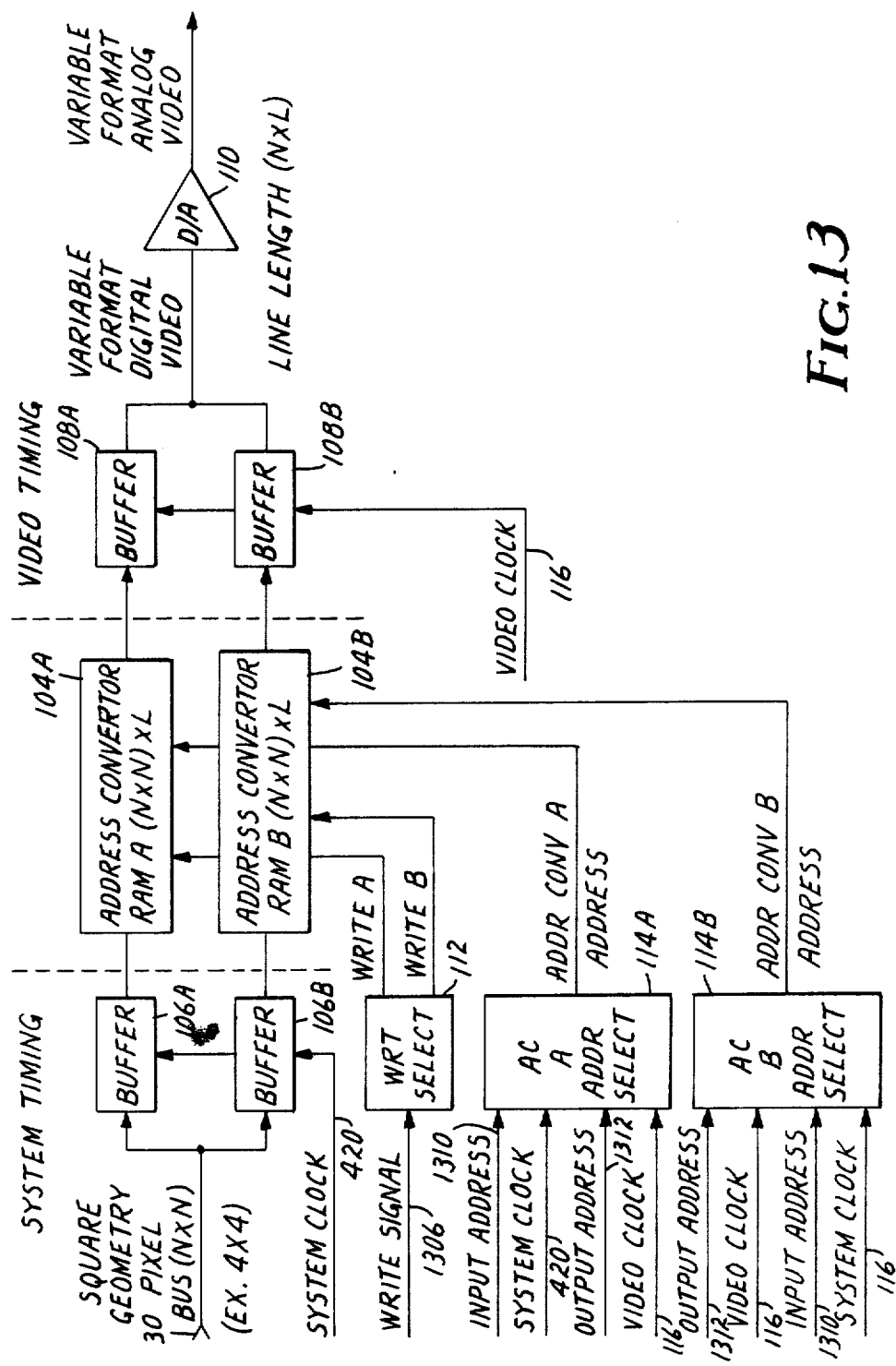
FIG. 13 is a functional block diagram of the display formatter of the system of FIG. 1.

FIG. 13 shows a preferred embodiment of display formatter 22, which converts pipelined image data which is encoded in a square 4×4 pixel format from pipeline bus 30 to asynchronous serial (line-by-line) video signals supplied to video display 24. Display formatter 22 decouples the output timing supplied to video display 24 from the input or system timing of pipeline bus 30. As a result, pipeline bus 30 can operate on a stop/start free flow basis without interfering with operation of video display 24.

As shown in FIG. 13, display formatter 22 includes a pair of double buffered address converter RAMS 104A and 104B. Subimage block pixel data is received from pipeline bus 30 by buffers 106A and 106B which are associated with RAMs 104A and 104B, respectively. The outputs of RAMs 104A and 104B are supplied to buffers 108A and 108B, respectively. The outputs of buffers 108A and 108B are provided to D/A converter 110, and the output is an analog video signal which is supplied to video display 24.

The control circuitry for display formatter 22 includes write select circuit 112, and address select circuits 114A and 114B.

Buffers 106A and 106B are operated using the system clock (420) provided by pipeline bus 30. One of the RAMs 104A or 104B is being written into using system timing produced by the system clock (420), while the other RAM is being read out using the timing (video clock) (116) of video display 24. The RAMs are reversed after a given length of time (for example four video lines) sufficient to allow both input and output completion.

For example, during a time when RAM 104A is being written into, the write A signal (1306) is being supplied to RAM A (104) and the address is being supplied from address select 114A to RAM 104A at a rate determined by the system clock (420). The starting address is the input address (1310) supplied to address select circuit 114A, and subsequent addresses are provided at the system clock (420) rate.

At the same time, RAM 104B is being read out by addresses from address select circuit 114B. The starting address (1312) is supplied by the output address input to address select circuit 114B, and the addresses supplied to RAM 104B are changed at the video clock rate.

As data is being read from RAM 104B into buffer 10BB, the previously read out data from RAM 104A which is in buffer 108A is being supplied to D/A converter 110 at the video clock (116) rate Display formatter 22 provides a number of significant advantages. First, by decoupling output timing from input timing, small time variations between pipeline bus 30 and video display 24 are permitted without having an adverse effect on one another. For example, variations in video timing as required for GENLOCK video capability is permitted without affecting system timing of the pipeline bus 30.

Second, dislay format 22 allows pipeline bus 30 to stop and start independently of video burst requirements as long as the average data rate is maintained over the swapping time of RAMs 104A and 104B. This permits utilization of horizontal blanking time for writing.

Third, display formatter 22 provides a conversion from subimage block pixel configurations (which are highly efficient for transferring image data on pipeline bus 30 to a data format which is compatible with normal operation of video display 24 (such as a line-by-line raster scan format).

7. Conclusion

The image processor of the present invention provides a highly efficient, adaptable, and high speed image processing architecture. The pipeline bus 30 of the present invention permits free flow data transfers so that a wide range of image processing functions of varying computational complexity can be performed.

The subimage block configuration used to transfer image data over pipeline bus 30 offers significantly increased speed and efficient addressing since only a single address needs to be provided in order to obtain an entire block of pixel data.

The parametric, pipelined, direct calculation of addresses in address generator 18 also offers high speed and accuracy. The use of adaptive FIR filtering for all intensity processing operations lends itself ideally to a high speed and highly flexible system. Finally, the asynchronous operation of display formatter 22 allows a free flow pipeline bus architecture while providing video display capability.

Although the present invention has been described with reference to preferred embodiments, workers skilled in the art will recognize that changes may be made in form and detail without departing from the spirit and scope of the invention.

What is claimed is:

1. A digital image processing system comprising:

pipeline bus means for transmitting addresses and data, and for transmitting handshake signals for controlling flow of addresses and data over the pipeline bus means;

image memory means connected to the pipeline bus means for storing digital image data;

address generator means connected to the pipeline bus means for generating the addresses; and processor means connected to the pipeline bus means for performing processing operations on the digital image data received over the pipeline bus means.

2. The digital image processing system of claim 1 wherein the pipeline bus means comprises:

pipeline address (PA) bus means over which the addresses are transmitted; and pipeline data (PD) bus means over which the data is transmitted.

3. The digital image processing system of claim 2 wherein the pipeline data bus means transmits handshake signals for indicating data is ready, for indicating data is accepted, and for requesting that data be held and repeated.

4. The digital image processing system of claim 2 wherein the pipeline address bus means transmits handshake signals for requesting that an address be held and repeated.

5. The digital image processing system of claim 2 wherein the pipeline bus means further includes:

master timing bus means for distributing clock and synchronization signals which define bus cycles and system cycles, each system cycle being formed by a plurality of bus cycles.

6. The digital image processing system of claim 5 wherein the PA bus means is time-division multiplexed.

7. The digital image processing system of claim 5 wherein an address is resident on the PA bus means for one bus cycle.

8. The digital image processing system of claim 5 wherein a data transfer operation over the PD bus means requires a system cycle to complete.

9. The digital image processing system of claim 2 wherein the pipeline bus means transmits digital image data in a format which represents a multipixel subimage block.

10. The digital image processing system of claim 9 wherein the subimage block is a rectangular block of pixels.

11. The digital image processing system of claim wherein the pixels of the subimage block are contiguous.

12. The digital image processing system of claim wherein the subimage block is an N×N block of contiguous pixels.

13. The digital image processing system of claim wherein N=4.

14. The digital image processing system of claim 11 wherein the address represents a location of one of the pixels of the subimage block.

15. The digital image processing system of claim 9 wherein the pixel whose location is represented by the address is located in a corner of the subimage block.

16. The digital image processing system of claim 14 wherein the address generator means comprises:

address generation pipeline means for producing a sequence of addresses; and first in/first out (FIFO) buffer means for 1 receiving the sequence of addresses from the address generation pipeline means and providing the addresses to the pipeline bus means.

17. The digital image processing system of claim 16 and further comprising:

control means connected to the address generation pipeline means and to first in/first out (FIFO) buffer means and responsive to the handshake signals, the control means for stopping and starting the address generation pipeline means.

18. The digital image prcocessing system of claim 16 wherein the address generation pipeline means comprises:

means for parametrically calculating virtual addresses; and means for converting the virtual addresses to physical addresses and providing the physical addresses to the FIFO buffer means.

19. The digital image processing system of claim wherein the means for parametrically calculating comprises:

parameter generator means for generating a set of parameter values for each address; and world image space calculator means for calculating virtual address coordinates as a function cf the set of parameter values.

20. The digital image processing system of claim 19 wherein the address generation pipeline means further comprises:

means for constructing a block of addresses around a base address defined by the virtual address coordinates; and means for separating the block of addresses into required and nonrequired bits to produce the virtual address.

21. The digital image processing system of claim 20 wherein the means for converting includes a lookup table for mapping the virtual address onto physical address space to produce the physical address.

22. The digital image processing system of claim 18 wherein the means for parametrically calculating performs a direct address calculation for each new address to be generated.

23. The digital image processing system of claim 10 wherein the processor means includes:

adaptive finite impulse response (FIR) filter means for performing arithmetic and logical operations on the digital image data as a function of filter coefficients; and means for providing the filter coefficients to the adaptive FIR filter means.

24. The digital image processing system of claim wherein the address generator means produces functional addresses associated with the addresses transmitted over the pipeline bus, and wherein the means for providing the filter coefficients selects the filter coefficients as a function of the functional addresses.

25. The digital image processing system of claim 23 wherein the image memory means stores, as part of the image data, a TAG field of bit-mapped data, and wherein the means for providing filter coefficients is responsive to the TAG field of bit-mapped data.

26. The digital image processing system of claim 1 and further comprising:

video display means for displaying images based upon the video signals; and display formatter means connected to the pipeline bus means for converting data from the pipeline bus means to the video signals.

27. The digital image processing system of claim 26 wherein the display formatter means allows the video display means and the pipeline bus means to operate asynchronously.

28. The digital image processing system of claim 27 wherein the display formatter means includes:
   first and second address converter means; and
   control means responsive to a system clock from the pipeline bus means and a video clock from the video display means, the control means during a first portion of each operating cycle of the display formatter writing digital image data from the pipeline bus means into the first address converter means at a rate controlled by the system clock while reading digital image data from the second address converter means at a rate controlled by the video clock to produce the video signals, and during a second portion of each operating cycle reading digital image data from the first address converter means at a rate controlled by the video clock to produce the video signals while writing digital image data from the pipeline bus means into the second address converter means at a rate controlled by the system clock.

29. A digital image processing system comprising:
   image memory means for storing digital image data for a plurality of pixels;
   address generator means for addressing the image memory means by providing an address representing a predetermined pixel of a multipixel subimage block;
   processor means for receiving and processing pixel data for the subimage block; and
   pipeline bus means connected to the image memory means, the address means and the processor means for transmitting the addresses produced by the address generator means and data representing subimage blocks.

30. The digital image processing system of claim 29 wherein the subimage block is a rectangular block of pixels.

31. The digital image processing system of claim 30 wherein the pixels of the subimage block are contiguous.

32. The digital image processing system of claim 31 wherein the subimage block is an $N \times N$ block of contiguous pixels.

33. The digital image processing system of claim 32 wherein $N=4$.

34. The digital image processing system of claim 30 wherein the address provided by the address generator means represents a corner pixel of the subimage block.

35. A pipeline intensity processor for use in a digital image processing system, the intensity processor comprising:
   input means for receiving digital image data to be processed;
   adaptive finite impulse response (FIR) filter means, coupled to the input means, for performing arithmetic and logical operations on the digital image data as a function of filter coefficients; and
   means, coupled to the filter means, for varying the filter coefficients.

36. The pipeline intensity processor of claim 35 wherein the means for varying the filter coefficients selects filter coefficients as a function of functional addresses which are associated with physical addresses of the digital image data.

37. The pipeline intensity processor of claim 35 wherein the digital image data includes a TAG image, and wherein the means for varying the filter coefficients selects filter coefficients as a function of the TAG image.

38. A pipeline bus for transferring addresses and data in parallel among a plurality of components of a digital image processing system, the pipeline bus comprising:
   a pipeline address bus connected within the digital image processing system over which a physical address is transmitted;
   a pipeline data bus connected within the digital image processing system over which data is transmitted, the pipeline data bus including handshake lines by which a master indicates it has data ready and by which a slave indicates whether it has accepted the data and whether the master is requested to hold and repeat the data; and
   a master timing bus connected within the digital image processing system for distributing clock and synchronization signals which define bus cycles and system cycles, each of the system cycles being defined by N bus cycles.

39. A digital image processing system comprising:
   pipeline bus means connected within the digital image processing system for transmitting addresses and digital image data;
   address generation pipeline means connected within the digital image processing system for producing a sequence of addresses;
   first in/first out (FIFO) buffer means connected within the digital image processing system for receiving the sequence of addresses from the address generation pipeline means and providing the addresses to the pipeline bus means;
   image memory means connected to the pipeline bus means and addressable by the addresses for storing the digital image data; and
   processor means connected to the pipeline bus means for performing processing operations on the digital image data received over the pipeline bus means.

40. The digital image processing system of claim 39 wherein the pipeline bus means includes means for transmitting handshake signals for controlling flow of addresses and digital image data over the pipeline means, and further comprising:
   control means responsive to the handshake signals for stopping and starting the address generation pipeline means.

41. The digital image processing system of claim 39 wherein the address generation pipeline means comprises:
   means for parametrically calculating virtual addresses; and
   means for converting the virtual addresses to physical addresses and providing the physical addresses to the FIFO buffer means.

42. The digital image processing system of claim 41 wherein the means for parametrically calculating comprises:
   parameter generator means for generating a set of parameter values for each address; and
   world image space calculator means for calculating virtual address coordinates as a function of the set of parameter values.

43. The digital image processing system of claim 42 wherein the address generation pipeline means further comprises:

means for constructing a block of addresses around a base address defined by the virtual address coordinates; and means for separating the block of addresses into required and nonrequired bits to produce the virtual address.

44. The digital image processing system of claim 43 wherein the means for converting includes a lookup table for mapping the virtual address onto physical address space to produce the physical address.

45. The digital image processing system of claim 41 wherein the means for parametrically calculating performs a direct address calculation for each new address to be generated.

46. A digital image processing system comprising:
pipeline bus means for transmitting addresses and data;
image memory means connected to the pipeline bus means for storing digital image data;
address generator means connected to the pipeline bus means for generating the addresses;
processor means connected to the pipeline bus means for performing processing operations on the digital image data received over the pipeline bus means;
video display means for displaying images based upon the video signals; and
display formatter means connected to the pipeline bus means for asynchronously converting data from the pipeline bus means to the video signals.

47. The digital image processing system of claim 46 wherein the display formatter means includes:
first and second address converter means; and
control means responsive to a system clock from the pipeline bus means and a video clock from the video display means, the control means during a first portion of each operating cycle of the display formatter writing digital image data from the pipeline bus means into the first address converter means at a rate controlled by the system clock while reading digital image data from the second address converter means at a rate controlled by the video clock to produce the video signals, and during a second portion of each operating cycle reading digital image data from the first address converter means at a rate controlled by the video clock to produce the video signals while writing digital image data from the pipeline bus means into the second address converter means at a rate controlled by the system clock.

* * * * *